United States Patent Office 2,820,805
Patented Jan. 21, 1958

2,820,805

PROCESS OF PREPARING KETO ACIDS

Muus G. J. Beets and Wilhelmina Meerburg, Hilversum, Netherlands, assignors to N. V. Polak & Schwarz's Essencefabrieken, Hilversum, Netherlands No Drawing. Application June 6, 1955
Serial No. 513,444

Claims priority, application Netherlands July 2, 1954

13 Claims. (Cl. 260—413)

The present invention relates to a process for the preparation of delta keto acids.

Delta keto acids of the type $$R-C(CH_2)_3COOH \quad \text{(I)}$$
$$\parallel$$
$$O$$

in which R is a substituted or non-substituted aliphatic hydrocarbon radical, can be considered as valuable raw materials for the preparation of a great number of products of divergent structure, many of which are of economic importance.

Thus, by reducing these keto acids, lactones which are applied as odoriferous substances can be prepared in the following manner:

$$R-C(CH_2)_3COOH \longrightarrow$$
$$\parallel$$
$$O$$

$$RCH(CH_2)_3COOH \longrightarrow RCH(CH_2)_3C=O$$
$$\mid \qquad\qquad\qquad\qquad\quad \mid$$
$$OH \qquad\qquad\qquad\qquad\quad O\text{———}$$
$$\text{(II)}$$

They can also be converted into fatty acids of varied structure by total reduction of the keto group:

$$R-C(CH_2)_3COOH \longrightarrow R(CH_2)_4COOH$$
$$\parallel$$
$$O \qquad\qquad\qquad\qquad\qquad\qquad \text{(III)}$$

This process can also be applied for the preparation of valuable macrocyclic lactones by selecting group R so that it contains a reactive group which is preferably terminal, e. g. a double bond, a hydroxyl group, an acyloxy group or a halogen atom which is able to react directly or indirectly with the carboxyl group, as follows:

$$HO(CH_2)_mC(CH_2)_3COOH \longrightarrow$$
$$\parallel$$
$$O$$

$$HO(CH_2)_{m+4}COOH \longrightarrow \begin{array}{c}\text{———}(CH_2)_{m+4}C=O\\ \mid\\ \text{———}O\text{———}\end{array}$$
$$\text{(IV)}$$

The purpose of the present invention is to provide a method of preparing delta keto acids of type (I) in a simple manner from readily avialable raw materials.

For this purpose, we start from compounds of the following type:

$$\begin{array}{c}O\\ \parallel\\ RC\diagdown\quad(CH_2)_2A\\ \diagdown C \diagup\\ \diagup\quad\diagdown\\ CH_3C\quad\quad B\\ \diagdown\\ O\end{array} \quad \text{(V)}$$

wherein R is an aliphatic hydrocarbon group which may be substituted or unsubstituted, and A and B are groups which may be hydrolized to a carboxyl group, e. g. an alkoxy carbonyl group, a cyan group or an amino carbonyl group.

Compounds of type (V) can be very simply prepared by condensation of an acid halide with a compound of the following type $$\begin{array}{c}O\quad B\\ \parallel \diagup\\ CH_3C-CH\\ \diagdown\\ (CH_2)_2A\end{array} \quad \text{(VI)}$$

in the following manner:

$$\begin{array}{c}O\qquad O\quad B\\ \parallel\qquad \parallel\diagup\\ RC-Cl + CH_3C-CH\\ \quad\qquad\qquad\mid\\ \qquad\qquad(CH_2)_2A\end{array} \longrightarrow \begin{array}{c}O\\ \parallel\\ RC\diagdown\quad(CH_2)_2A\\ \diagdown C\diagup\\ \diagup\quad\diagdown\\ CH_3C\quad\quad B\\ \diagdown\\ O\end{array} \quad \text{(VII)}$$

In general, compounds of type V cannot be distilled but they can be converted into the desired keto acids in crude form according to the present invention, by which the simplicity of the process is still further increased.

The preparation of compounds of the type (VI) is very simple since the cyan ethylation method and its variants may be used, i. e. the condensation of an ester of acetyl acetic acid with acrylonitrile, acrylamide or esters of acrylic acid under the influence of alkaline catalysts. This is illustrated by the following reaction schemes wherein Et represents ethyl and Me methyl:

$$CH_3COCH_2COOEt + CH_2=CHCN \longrightarrow CH_3COCH\diagup\begin{array}{c}CH_2CH_2CN\\ \diagdown COOEt\end{array}$$
$$\text{(VIII)}$$

$$CH_3COCH_2COOEt + CH_2=CHC\diagup\begin{array}{c}O\\ \diagdown NH_2\end{array} \longrightarrow$$

$$CH_3COCH\diagup\begin{array}{c}CH_2CH_2C\diagup\begin{array}{c}O\\ \diagdown NH_2\end{array}\\ \diagdown COOEt\end{array} \quad \text{(IX)}$$

$$CH_3COCH_2COOEt + CH_2=CH-COOMe \longrightarrow$$

$$CH_3COCH\diagup\begin{array}{c}CH_2CH_2COOMe\\ \diagdown COOEt\end{array} \quad \text{(X)}$$

The present invention is based on a selective splitting off of the smallest acyl group from compound V, whilst maintaining the largest acyl group, by alkaline hydrolysis or by alcoholysis, followed by or preferably simultaneously with saponification of group A to a carboxyl group and removal of group B, by hydrolysis and decarboxylation.

It is very surprising that this result can be obtained in one single operation by treating compound V either in crude or in purified form, diluted with a solvent or not, with aqueous lye to which alcohols or other substances may be added or not.

Furthermore it also is surprising that the reaction conditions, especially the temperature, the kind and concentration of the lye and the kind of the solvent, if any, added, may be varied substantially in an unlimited way without this having any influence of importance on the yield. It is not important either whether the lye is added to the ester to be hydrolysed or that one proceeds in the reversed manner.

Treatment preferably is carried out with soda or potash lye of 10–25% as the hydrolysing agent, whilst it seems that the yield is somewhat favorably influenced by having the reaction proceed quickly. For this purpose one preferably operates at 70–100° C.

Although this means a superfluous complication for the preparation of the delta keto acids in general, as already indicated above, if desired the reaction may take place in two separate stages. In this case the ester V is first treated in an alcohol and in the presence of a catalytic quantity of a catalyst suitable for this purpose, e. g. an alkali metal alcoholate, an alkali metal hydroxide or ammonia. In this treatment also, the reaction conditions can be varied within wide limits. E. g. the mixture may be allowed to stand during some hours at room temperature or it may be heated to the boiling point for ¼–½ hour.

During this treatment, the smaller of the two acyl groups is primarily split off, according to the following scheme in which R"OH represents the alcohol in which the alcoholysis is carried out:

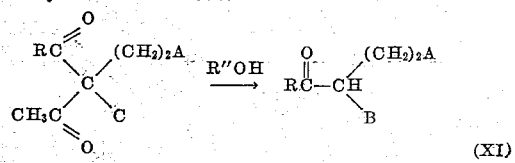

(XI)

After purification or not the product obtained can then be converted into the desired keto acid I by hydrolysis with aqueous alkali.

The two-stage process, however, does not give an improvement of yield in comparison with the one-stage operation.

Isbell, Wojcik and Adkins (J. Am. Chem. Soc. 54 (1932) 3678) have devoted an extensive examination to the question, whether it is possible to prepare keto acids I from esters of type V. The methods examined by these authors are: alcoholysis at 60° C. under influence of hydrochloric acid and alcoholysis at 150–250° C. and 100 atmospheres.

In all experiments (with the exception of one single case in which R was an aromatic group) it appeared, however, that mainly the largest of the two acyl groups was split off.

Therefore it is surprising that in contradistinction with the results of Isbell et al. it appeared to be possible to split off mainly the smallest of the two acyl groups from V and to prepare the desired keto acid in good yield.

The invention is elucidated by the following examples.

EXAMPLE 1

*Preparation of 4-keto tetradecene-13 carboxylic acid-1*

One brings 66.8 g. (2.75 mol) of magnesium and 725 g. of absolute benzene into a reaction apparatus. One adds 15 g. of carbon tetrachloride, heats to boiling and adds 15 g. of absolute ethanol in 10 minutes. When the reaction starts one adds gradually 238 g. of absolute ethanol and thereupon, also under boiling, slowly 594 g. (2.75 mol) of methyl 4-keto 3-etoxy carbonyl pentane carboxylate. One thereupon boils for another 1½ hour, cools to 25° C. and adds 506 g. (2.5 mol) of decene-9 carboxylic acid chloride drop by drop during ½ hour.

Stirring is continued during ¼ hour at 25° C. and thereupon for some time at 35° C. and then under cooling in ice water 1500 g. of 10% sulphuric acid are added. After working up and distilling off the benzene 989 g. of crude methyl 4-keto 3-acetyl 3-ethoxy carbonyl-tetradecene-13 carboxylate are obtained. 395.5 g. of this crude product are heated to boiling with 1000 g. of methanol and in 25 minutes 600 g. of soda lye 33% are added. Boiling is continued for 25 minutes and the methanol is distilled off. One works up with benzene and recrystallizes the keto tetradecene carboxylic acid from petroleumether. The yield is 48% of the theory, calculated on the acid chloride used. Melting point 68–68.5° C.

After reduction of the keto group this compound can according to the Netherlands Patent No. 67,458 be converted into the valuable odoriferous substance pentadecanolide.

EXAMPLE 2

*Preparation of 4-keto tetradecene-13 carboxylic acid-1*

One prepares the crude methyl keto acetyl ethoxycarbonyl tetradecene carboxylate according to Example 1. One heats 197.5 g. of the crude product to 70° C. and adds in ½ hour 800 g. of 12.5% soda lye with stirring. One stirs at 70° C. for another ½ hour, cools and pours into 650 g. of 20% sulphuric acid and works up according to Example 1. Yield 50% of the theory, calculated on the acid chloride. Melting point 67–68° C.

EXAMPLE 3

*Preparation of 4-keto tetradecene-13 carboxylic acid-1*

One prepares crude methyl keto acetyl ethoxy-carbonyl tetradecene carboxylate according to Example 1. One heats a mixture of 800 g. of soda lye 12.5% and adds 196 g. of crude condensation product with stirring in ¼ hour. One continues stirring until the reaction is complete and works up. Yield 50% of the theory, calculated on the acid chloride used. Melting point 67–68° C.

EXAMPLE 4

*Preparation of 4-keto tetradecene-13 carboxylic acid-1*

Crude methyl keto acetyl ethoxycarbonyl tetradecene-13 carboxylate is prepared according to Example 1.

One heats 400 g. of 25% soda lye to 70° C. and adds 196 g. of crude condensation product in ¼ hour. One continues stirring until the reaction is complete and works up. After recrystallisation of the crude keto acid from petroleumether the keto tetradecene carboxylic acid is obtained in a yield of 47% of the theory, calculated on the acid chloride brought to reaction. Melting point 67–68° C.

EXAMPLE 5

*Preparation of 4-keto tetradecene-13 carboxylic acid-1*

One condenses methyl keto ethoxycarbonyl pentane carboxylate with decene carboxylic acid chloride according to Example 1.

After completion of the condensation reaction one adds a solution of 5.8 g. (0.25 mol) of sodium in 402 g. of absolute ethanol and then boils during ½ hour. One cools to room temperature and acidifies with 10% sulphuric acid. After washing one distills off the benzene completely and adds 2000 g. of methanol. One heats to boiling and adds 1200 g. of 33% soda lye drop by drop.

After completion of the hydrolysis one works up according to Example 1. The keto tetra decene carboxylic acid is obtained in a yield of 49% of the theory, calculated on the acid chloride brought to reaction. Melting point 67–68° C.

EXAMPLE 6

*Preparation of 4-keto decane carboxylic acid-1*

1426 g. (6.6 mol) of methyl 4-keto 3-ethoxycarbonyl pentane carboxylate are condensed with 891 g. (6 mol) of hexane carboxylic acid chloride with the aid of 160.4 g. of magnesium (6.6 mol), according to Example 1. After removal of the solvent 1849 g. of crude methyl 4-keto 3-acetyl 3-ethoxycarbonyl decane carboxylate-1 are obtained. 800 g. of 12.5% soda lye are heated to 70° C. and 154 g. of the crude condensation product are added drop by drop in ¼ hour with stirring. Heating is continued until the hydrolysis is complete. One pours out into 650 g. of 20% sulphuric acid and works up. The crude keto acid is distilled in vacuo and recrystalized from petroleum ether. The yield amounts to 46% of the theory, calculated on the hexane carboxylic acid chloride brought to reaction. Melting point 57.5–58.5° C. 36.3% of the theory of hexane carboxylic acid are obtained as a by-product.

EXAMPLE 7

*Preparation of 4-keto decane carboxylic acid-1*

To 2000 g. of 5% soda lye which has been heated to 70° C. one adds 154 g. of crude methyl keto acetyl ethoxycarbonyl decane carboxylate, prepared according to Example 6 in ¼ hour and thereupon 25 cm.³ of ethanol and heats until hydrolysis is complete. After working up and recrystallisation the yield amounts to 44% of the theory. Melting point 58.5–59.5° C.

EXAMPLE 8

*Preparation of 4-keto decane carboxylic acid-1*

One heats 300 g. of soda lye 33% to 70° C. and adds 154 g. of crude methyl keto acetyl ethoxycarbonyl decane carboxylate prepared according to Example 6 in 20 minutes with stirring. One heats until the reaction is complete and works up. The yield amounts to 40% of the theory. Melting point 57.5–58.5° C.

EXAMPLE 9

*Preparation of 4-keto decane carboxylic acid-1*

One heats 800 g. of potash lye to 70° C. with stirring. One adds 154 g. of crude methyl keto acetyl ethoxycarbonyl decane carboxylate in 15 minutes with stirring which is continued until the reaction is complete. Duration approximately 1 hour. One pours out into dilute sulphuric acid and works up. The yield amounts to 45% of the theory. Melting point 58.5–59.5° C. One recovers hexane carboxylic acid as a by-product.

EXAMPLE 10

*Preparation of 4-keto decane carboxylic acid-1*

One heats to boiling 800 g. of 12.5% of soda lye and adds 154 g. of crude methyl keto acetyl ethoxycarbonyl decane carboxylate, prepared according to Example 6 in ¼ hour. One boils during 1 hour and works up. The yield amounts to 46% of the theory. Melting point 57.5–58.5° C. One obtains as a by-product 23 g. of hexane carboxylic acid.

EXAMPLE 11

*Preparation of 4-keto decane carboxylic acid-1*

One heats to boiling a mixture of 300 g. of soda lye 33%, 200 g. of water and 300 g. of alcohol and adds 154 g. of crude methyl keto acetyl ethoxycarbonyl decane carboxylate in 20 minutes. One continues stirring until completion of the reaction, distills off the alcohol and works up in the usual way. The yield amounts to 48% of the theory, whilst 22.5 g. of hexane carboxylic acid are recovered.

EXAMPLE 12

*Preparation of 4-keto decane carboxylic acid-1*

One heats to boiling 200 g. of 5% soda lye and adds 154 g. of crude methyl keto acetyl ethoxycarbonyl decane carboxylate, prepared according to Example 6, in ¼ hour. One boils until the reaction is complete and works up. The yield amounts to 48% of the theory. Melting point 58.5–59.5° C.

EXAMPLE 13

*Preparation of 4-keto decane carboxylic acid-1*

One heats 500 g. of 20% soda lye to 40° C. and at this temperature one adds 154 g. of crude methyl keto acetyl ethoxycarbonyl decane carboxylate, prepared according to Example 6, in 10 minutes. One continues stirring until saponification is complete and works up, in the usual way. The yield of keto decane carboxylic acid amounts to 43% of the theory calculated on the acid chloride. Melting point 58.5–59.5° C.

EXAMPLE 14

*Preparation of 4-keto decane carboxylic acid-1*

One condenses 594 g. of methyl 4-keto 3-ethoxycarbonyl pentane carboxylate with 371 g. of hexane carboxylic acid chloride with the aid of 66.8 g. of magnesium, according to Example 1.

When the condensation is complete one adds a solution of 5.8 g. of sodium in 402 g. of absolute ethanol and boils during ½ hour. One acidifies, washes to neutral reaction and removes the solvent. When distilling, 34% of the theory of ethyl hexane carboxylate, 39% of the theory of ethyl 4-keto 3-ethoxycarbonyl pentane carboxylate, and 50% of the theory of ethyl 4-keto 3-ethoxycarbonyl decane carboxylate are obtained. In a duplicate preparation these quantities were 28%, 43% and 53% respectively. The last substance is saponified by boiling with a mixture of 436 g. of soda lye 33% and 720 g. of methanol. After working up and purifying keto decane carboxylic acid is obtained in a yield of 85% of the theory, calculated on the ethyl 4-keto 3-ethoxycarbonyl decane carboxylate brought to reaction, or 42–45%, calculated on hexane carboxylic acid chloride.

EXAMPLE 15

*Preparation of 4-keto nonane carboxylic acid-1*

According to Example 1 one condenses 197 g. of 3-ethoxycarbonyl 4-keto pentane carboxylic acid nitrile with 132 g. of capronic acid chloride with the aid of 26.2 g. of magnesium. After completion of the condensation reaction the crude reaction product is worked up according to Example 13 in one operation or according to Example 14 in two operations. One continues the hydrolysis until no ammonia escapes anymore. In both cases keto nonane carboxylic acid is obtained in a substantially equal yield. Melting point 55–55.5° C.

EXAMPLE 16

*Preparation of 4-keto undecane carboxylic acid-1*

According to Example 1 one condenses 594 g. of methyl 4-keto 3-ethoxycarbonyl pentane carboxylate with 406 g. of heptane carboxylic acid chloride with the aid of 66.8 g. of magnesium.

After completion of the reaction one adds a solution of 10 g. of potassium in 402 g. of ethanol. One boils during ½ hour, cools and adds 2000 g. of sulphuric acid 10% with cooling and stirring. One washes to neutral reaction, distills off the solvent and fractionates the residue.

One obtains 32% of the theory of recovered heptane carboxylic acid, 32% of the theory of ethyl 4-keto 3-ethoxycarbonyl pentane carboxylate and 56% of the theory of ethyl 4-keto 3-ethoxycarbonyl undecane carboxylate (439 g.).

Mixed with 878 g. of methanol the latter is heated to boiling and 509 g. of 33% soda lye are added drop by drop. After completion of the hydrolysis methanol is distilled off and the reaction product is acidified with dilute sulphuric acid.

After working up and recrystallisation the keto acid is obtained in a yield of 46% of the theory calculated on the heptane carboxylic acid chloride brought to reaction. Melting point 67–68° C.

If the reaction is carried out in one operation by saponifying the crude condensation product with boiling 15% soda lye the same yield is obtained.

EXAMPLE 17

*Preparation of 3-keto nonane carboxylic acid-1*

According to Example 1 one condenses 594 g. of ethyl 3-keto 2-ethoxycarbonyl butane carboxylate with 371 g. of hexane carboxylic acid chloride with the aid of 66.8 g. of magnesium.

One obtains 842 g. of crude ethyl 3-keto 2-acetyl 2-ethoxycarbonyl nonane carboxylate-1.

In 15 minutes one adds 168 g. of this crude reaction product to 800 g. of 12.5% soda lye which have been heated to boiling. One boils for a further hour, acidifies with 1300 g. of 10% sulphuric acid and purifies the crude acid by vacuum distillation and by recrystallisation from petroleum ether. The yield amounts to 55% of the theory calculated on the hexane carboxylic acid chloride brought to reaction. Melting point 68–68.5° C.

EXAMPLE 18

*Preparation of 14-hydroxy 4-keto tetradecane carboxylic acid-1*

According to Example 1 one condenses 706.5 g. (2.5 mol) of 10-bromo decane carboxylic acid chloride with 632.5 g. (2.75 mol.) of ethyl 4-keto 3-ethoxy-carbonyl pentane carboxylate with the aid of 66.8 g. (2.75 mol.) of magnesium. After completion of the condensation reaction, one adds 1500 cm.³ of sulphuric acid 10% and after washing one distills off the solvent. The weight of the crude ethyl 4-keto 3-acetyl 3-ethoxycarbonyl 14-bromo tetradecane carboxylate amounts to 1227 g.

4800 g. of 12.5% soda lye (15 mol) are heated to boiling and one adds 1227 g. of crude condensation product drop by drop in 15 minutes with boiling and stirring. One boils during 4 hours, cools to room temperature and adds 1700 g. of 35% sulphuric acid while cooling. One adds 1250 cm.³ of benzene, one heats to 70° C. while stirring and adds 100 g. of acetic acid. One separates off the benzenic layer, washes with warm water and cools to 10° C. A mixture of 14-hydroxy 4-keto tetradecane carboxylic acid and 10-hydroxy decane carboxylic acid crystallizes out. One filters and dries. Weight 435 g. When separating one obtains 14-hydroxy 4-keto tetradecane carboxylic acid with melting point 88–89° C. in a yield of 45% calculated on the bromo decane carboxylic acid chloride brought to reaction.

After reduction of the keto group this compound can be converted into the valuable odoriferous substance pentadecanolide by cyclization.

What we claim is:

1. A process for the preparation of delta keto acids of the general formula R.CO(CH₂)₃COOH, comprising subjecting to alkaline solvolysis including alkaline hydrolysis a diacyl derivative of the general formula

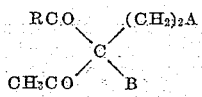

wherein A and B are groups which may be hydrolized to carboxyl groups, and R is selected from the group consisting of substituted and non-substituted aliphatic hydrocarbon groups.

2. The process of claim 1, wherein the hydrolysis is effected in the presence of a solvent.

3. The process of claim 1, wherein the diacyl derivative is subjected to alkaline alcoholysis followed by hydrolysis.

4. The process of claim 3, wherein the alcoholysis is effected in the presence of an alkaline-reacting catalyst.

5. The process of claim 1, wherein the diacyl derivative is subjected to alkaline alcoholysis in the presence of an alkaline-reacting catalyst, the reaction product is at least partially purified and the at least partially purified reaction product is subjected to hydrolysis.

6. The process of claim 1, wherein the diacyl derivative is subjected to alkaline hydrolysis with a 10–25% aqueous solution of an alkali hydroxide.

7. The process of claim 1, wherein the hydrolysis is carried out at a temperature between about 70° C. and the boiling temperature of the reaction medium.

8. A process for the preparation of delta keto acids of the general formula R.CO(CH₂)₃COOH, comprising subjecting to alkaline solvolysis including alkaline hydrolysis a diacyl derivative of the general formula

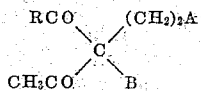

wherein A and B are groups selected from the group consisting of ester, amide and cyan groups, and R is selected from the group concisting of substituted and non-substituted aliphatic hydrocarbon groups.

9. The process of claim 8, wherein the hydrocarbon groups are alkyl groups.

10. A process for the preparation of hydroxy delta-keto acids, comprising subjecting to alkaline solvolysis including alkaline hydrolysis a diacyl derivative of the general formula

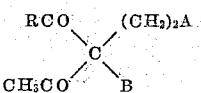

wherein A and B are groups which may be hydrolyzed to carboxyl groups, R is a substituted aliphatic hydrocarbon containing a reactive group which may be hydrolyzed to a hydroxyl group.

11. The process of claim 10 for the preparation of 14-hydroxy-4-keto-tetradecane carboxylic acid-1, wherein the largest acyl group in the diacyl derivative is

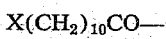

X being a halogen atom.

12. A process for the preparation of unsaturated delta-keto acids, comprising subjecting to alkaline solvolysis including alkaline hydrolysis a diacyl derivative of the general formula

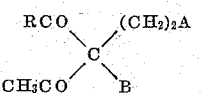

wherein A and B are groups which may be hydrolyzed to carboxyl groups, and R is selected from the group consisting of substituted and non-substituted aliphatic hydrocarbon groups containing a double bond.

13. The process of claim 12 for the preparation of 4-keto tetradecene-13 carboxylic acid-1, wherein the largest acyl group in the diacyl derivative is

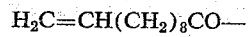

References Cited in the file of this patent

Isbell et al.: J. Am. Chem. Soc., vol. 54, pages 3678–3687 (1932).

Adams et al.: Organic Reactions, vol. 1, page 301 (Copyright 1942).